United States Patent [19]

Dillon

[11] 4,047,203
[45] Sept. 6, 1977

[54] COLOR IMAGING ARRAY
[75] Inventor: Peter L. P. Dillon, Pittsford, N.Y.
[73] Assignee: Eastman Kodak Company, Rochester, N.Y.
[21] Appl. No.: 685,824
[22] Filed: May 12, 1976
[51] Int. Cl.² .............................................. H04N 9/07
[52] U.S. Cl. ..................................................... 358/44
[58] Field of Search ........................ 358/41, 44, 43, 15
[56] References Cited
U.S. PATENT DOCUMENTS

| | | | |
|---|---|---|---|
| 2,702,830 | 2/1955 | Kalfaian | 358/15 |
| 3,461,223 | 8/1969 | Wilcox | 358/44 |
| 3,971,065 | 7/1976 | Bayer | 358/41 |

Primary Examiner—Richard Murray
Assistant Examiner—Mitchell Saffian
Attorney, Agent, or Firm—G. E. Grosser

[57] ABSTRACT

Light responsive elements of a color imaging array are arranged in basic groupings of four aligned elements, which groupings included two luminance-responsive elements that alternate with individual elements for two other basic colors. These groupings are repeated along a line and are shifted by one element in each adjacent line. As a result of intermixing color-responsive elements in this way, high-spatial-frequency luminance sampling is achieved for all directions on the array and closely repeated patterns of elements are achieved for all three basic colors in both fields of the array (here assuming a two-field interlaced readout array). Because closely repeated sampling occurs for all colors in both fields of such an array, the field-to-field color flicker, that can occur when intermixed color sampling is attempted using an interlaced-readout imaging array, is avoided.

8 Claims, 17 Drawing Figures

LUMINANCE - DOMINATED TETRADS

TYPE 1  | L | R | L | B |
TYPE 2  | B | L | R | L |
TYPE 3  | L | B | L | R |
TYPE 4  | R | L | B | L |

| L | = LUMINANCE RESPONSIVE ELEMENT
| R | = RED RESPONSIVE ELEMENT
| B | = BLUE RESPONSIVE ELEMENT

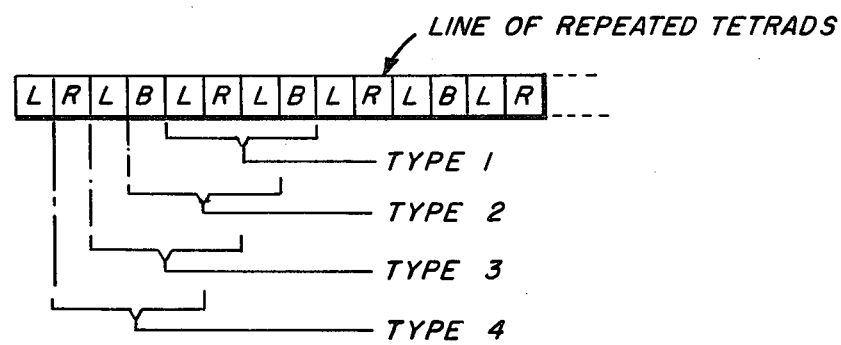
*FIG. 3a*
*FIG. 3b*
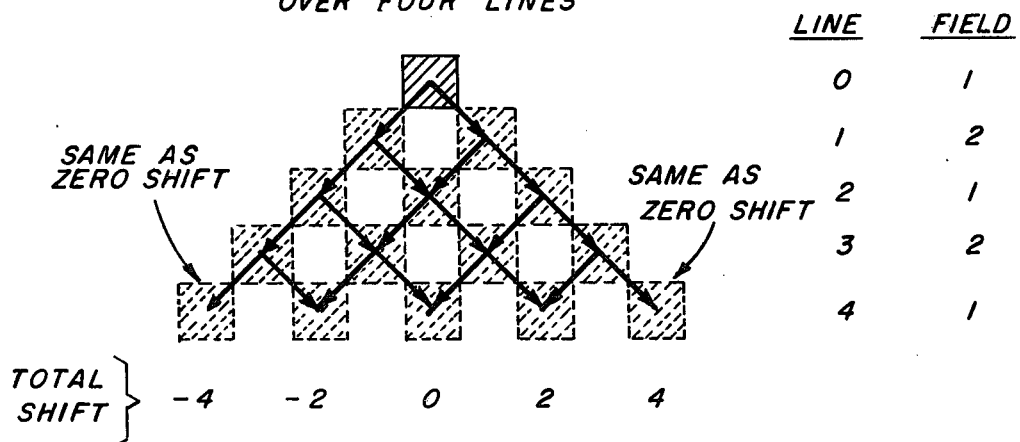
*FIG. 4*

FIG. 5a
DISPLACEMENT SEQUENCE
+1, +1, +1, +1 - - - -
FIG. 5b
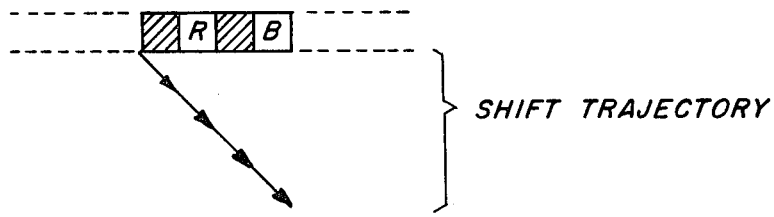
FIG. 5c
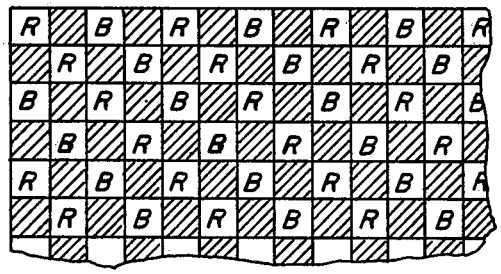
RESULTANT TWO DIMENSOINAL COLOR SAMPLING CONFIGURATION
CHARACTERISTIC SAMPLING PATTERNS IN EACH FIELD
FIG. 5d
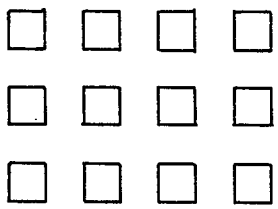
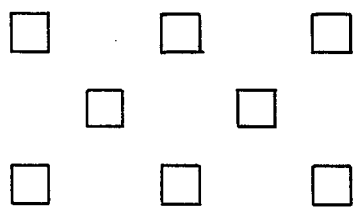

FIG. 6a
DISPLACEMENT SEQUENCE
$-1 \quad +1 \quad -1 \quad +1 \quad \cdots \cdots$
FIG. 6b
DISPLACEMENT TRAJECTORY
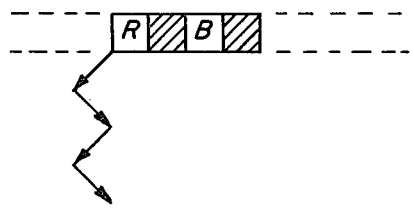
FIG. 6c
RESULTANT TWO DIMENSIONAL COLOR SAMPLING CONFIGURATION
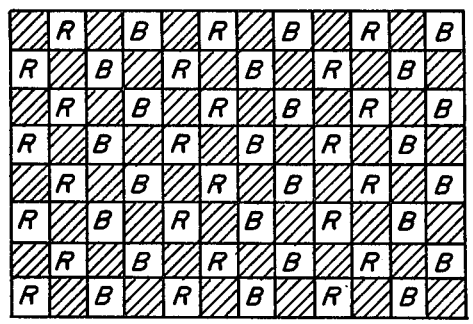
FIG. 6d
CHARACTERISTIC SAMPLING PATTERN IN EACH FIELD
LUMINANCE    BLUE / RED
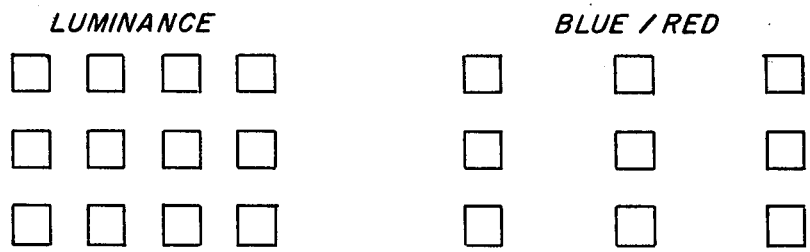

FIG. 7a
DISPLACEMENT SEQUENCE
+1 -1 +1 -1 ---
FIG. 7b
CORRESPONDING DISPLACEMENT TRAJECTORY
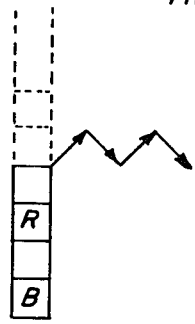
FIG. 7c
RESULTANT TWO DIMENSIONAL COLOR SAMPLING CONFIGURATION
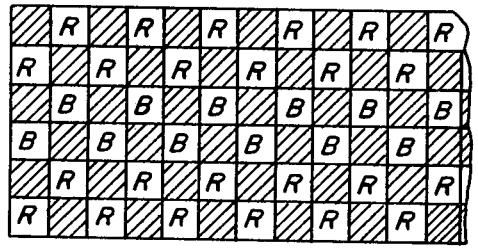
FIG. 7d
CHARACTERISTIC SAMPLING PATTERNS IN EACH FIELD
LUMINANCE
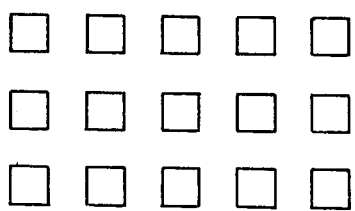
RED /BLUE
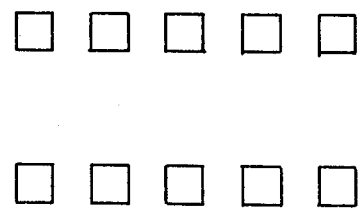

COLOR IMAGING ARRAY

BACKGROUND OF THE INVENTION

1. Field of the Invention

The invention relates to imaging devices which extract image information for three colors at a single imaging area.

2. Description Relative to the Prior Art

It is well known to convert a color image to electrical signal form using photoelectric apparatus which extracts image information for at least three basic colors. If solid-state imaging apparatus, such as a CCD imaging array, is to be employed for extracting such information, the number of elemental sampling areas on the individual array (or arrays) influences both array cost and availability. Indeed, the present state of the art allows for, in a single solidstate array, little more than sufficient elements to permit high quality monochrome imaging. Accordingly, if such color imaging is to be performed at a single area (i.e., on a single array), as is desirable for reasons of economy and to avoid relative color registration problems, a limited number of available elements must be allocated among all three basic colors. It is therefore important to use the available elements as effectively as is possible.

In U.S. Patent Application No. 555,477 to Bayer, filed March 5, 1975, now U.S. Pat. No. 3,971,065, patterned arrays of photosensitive elements are described which extract color image information in a highly efficient manner considering human visual acuity for color detail. According to Bayer the elements most closely corresponding to luminance response (for example green for a preselected green-red-blue basic color system) comprise substantially 50 percent of the array and are located along alternate diagonals of the array. This arrangement results in high spatial frequency sampling for luminance, the spectral component for which the human visual system has the greatest resolving power. Information regarding the other two colors is derived at respective ones of the remaining element locations. In the preferred implementation for such arrays, highly efficient sampling of the other two colors is achieved by intermixing elements for those colors with luminance-responsive elements on an alternative row basis e.g., green alternates with blue in one line and alternates with red on the next line and so on. A problem arises however when interlaced scanning is employed with such arrays in that a serious field-to-field color flicker occurs. In fact, this effect is so disturbing as to make it impossible to continue viewing the image reproducible from the derived color signals for any significant period of time.

One possible approach for overcoming the element allocation problems introduced by an interlaced scan is described in U.S. Published Patent Application B502,289. This approach, however, requires a special solid state imaging array which provides for overlapping of elements from one field to the other. Also, a rather elaborate filter configuration is required which associates with each zone (elemental area) of the array two or more sub-areas that have different light attenuation characteristics.

SUMMARY OF THE INVENTION

The invention provides for definition and implementation of arrays of color-responsive elements for three respective basic colors, which arrays achieve highly efficient color image sampling, considering human visual acuity characteristics, while avoiding the annoying, indeed nauseating, field-to-field color flicker which can occur where interlaced array readout is utilized.

To implement the sampling plan of the invention, a basic four-element alignment (side-by-side arrangement of four elements) is employed in which luminance response occurs at alternate positions and responses for the other two colors occur at respective ones of the remaining positions... thus producing a "luminance-predominant tetrad alignment." This tetrad alignment is repeated along a line (row or column alignment may be chosen) and is shifted by one element in adjacent lines. By so shifting the tetrads in adjacent lines, the efficient diagonal pattern for luminance sampling described by Bayer (U.S. Patent Application 555,477 filed Mar. 5, 1975 as mentioned above) perforce results while, additionally, closely repeated sampling patterns are established for all three basic colors in both fields of the array. Moreover, by virtue of the sampling plan of the invention, the individual non-luminance colors must occur at regular intervals of four elements, and they must occur in a different field for each adjacent alignment. In the case of row alignments this characteristic results from the fact that the tetrads repeat in each row causing each color to repeat at regular row intervals (4 element intervals for non-luminance and 2 element intervals for luminance) irrespective of whether an odd or even row is considered. With columnwise alignments it is the shifting of adjacent lines by one element which causes the evenly spaced non-luminance colors to occur in different fields for adjacent lines (columns). Such change in field in the case of columnwise alignments occurs necessarily as a result of the constraint requiring shifting adjacent lines of tetrads by one element.

As indicated above, the tetrads may be aligned in either a rowwise or columnwise direction (rows being alignments which are sequentially scanned, typically the horizontal alignments, and columns being alignments perpendicular thereto). However by, as is preferred, aligning the tetrads with the direction of scanning (i.e., in rows), three essentially continuous color signals can be maintained during array interrogation, without requiring that information be held over from row to row or, for that matter, for more than four readout cycles i.e., the time to interrogate four adjacent row elements. Also, no more than one item of color information need be stored in any given time for the respective colors. This simplicity in signal processing contrasts with the situation for certain columnwise arrangements that result in rows which include elements for only two colors of the preselected three-color basis.

For such columnwise arrangements it is necessary to hold over a significant portion (generally twenty-five percent) of each row of information in order to maintain three meaningful color signals continuously.

It should be noted that, in shifting the tetrads of adjacent lines according to the invention, various displacement sequences may be employed, as is discussed more fully below, and those sequences which repeat within a distance of four lines are preferred to assure closely-spaced color patterns in two dimensions. Such closely-spaced patterns serve to reduce the noticeability of artifacts of sampling.

The invention will now be described in detail with reference to the drawings wherein:

FIG. 3A is a representation of different arrangements for luminance dominated tetrad alignments;

FIG. 3B serves to teach the influence of reference location on tetrad arrangement;

FIG. 4 indicates the line shifting possibilities under the shift constraints imposed according to the invention;

FIGS. 5A through 5D indicate the development of a presently preferred three color sampling configuration according to the invention;

FIGS. 6A through 6D indicate the development of an alternative three color sampling configuration according to the invention; and FIGS. 7A through 7D indicate the development of a column-aligned sampling configuration according to the invention.

Figure 1:
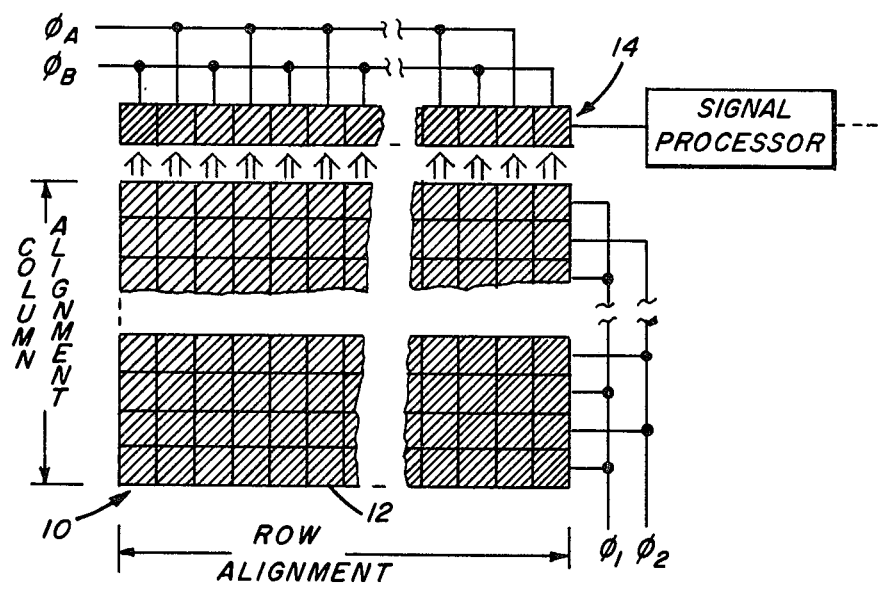
FIG. 1 is a simplified plan view of a known type of interline solid-state imaging array.

Referring to FIG. 1, a solid state imaging array 10 (shown in simplified form) of a type suitable for use in implementing the invention comprises a rectangular arrangement of individual photoelectric elements, such as the element denoted 12. The array 10 may, for example, be one of the well known charge-coupled arrays in which image information is typically shifted by rows to a register such as register 14 which is connected in parallel to an end row of the array (such shifting is indicated by a series of broad arrows in the figure).

Figure 2:
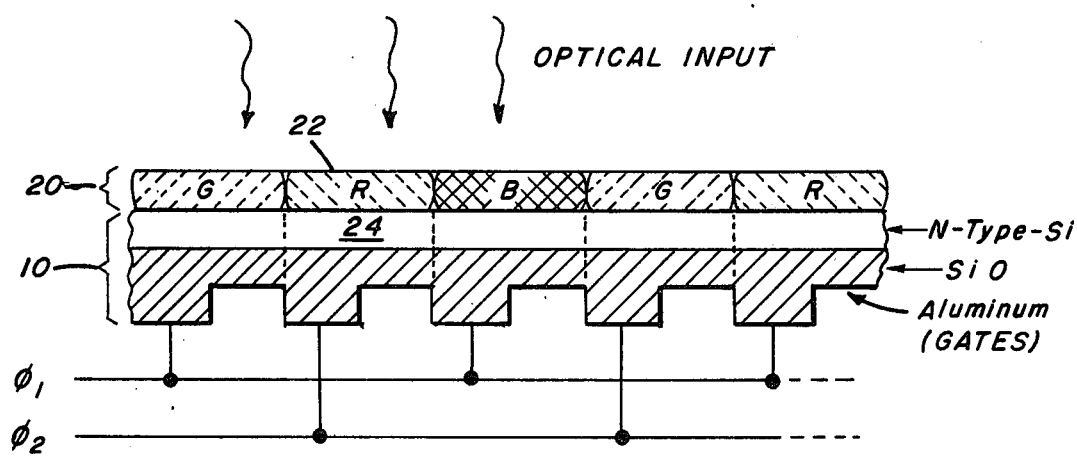
FIG. 2 is a partial cross-sectional view of a solid-state imaging array of the charge-coupled type with a superposed filter mosaic.

Now referring to FIG. 2, a mosaic 20 of individual absorption filter elements, such as the element 22, is arranged in superposition and in one-to-one registration with elements of a charge-coupled imaging array 10. (For purposes of clarity of illustration a "backside illuminated" array is shown; however, the mosaic 20 may alternatively be arranged on the opposite array face for operation in the more common front illuminated mode, i.e., with the optical input arriving in the direction opposite that shown). It is well known, that by arranging absorption-type filters in this way, individual elements of an array, say the element denoted 24, may be sensitized to a preselected wavelength range of light (the characters G, R and B indicate filters passing green, red, and blue light respectively). Such a filter and array element combination provides one possibility for achieving, selectively desired, light responses for elemental areas on the array. Other techniques may, however, be employed to customize the response of subareas of an overall imaging area. For example, array elements may be produced having an inherent selective sensitivity within the visible spectrum (see U.S. Pat. No. 3,717,724). The significance of such selective response to the implementation of the invention will become apparent in the discussion which follows:

The present invention, as was mentioned above, takes recognition of the enhanced resolving power of the human visual system for luminance detail by implementing two-dimensional sampling plans in the form of specially sensitized arrays which are made up of "luminance predominant tetrad alignments". That is, arrays according to the invention are substantially made up of aligned groupings of four elements, two of which are essentially luminance responsive while the remaining two elements respond to two other respective basic colors (these basic colors plus luminance make up a preselected three color basis). FIG. 3A indicates the four possible tetrad alignments incorporating 1) two elements responsive to luminance (which may be essentially a sensitivity in the green wavelength range), 2) a red responsive element and 3) a blue responsive element. In arrangements according to the invention, the tetrad is repeated in the direction of alignment thus producing a line of elements which is luminance dominated (i.e., has more luminance elements than elements for any other color) and includes all three colors at regular intervals. FIG. 3B serves to indicate that, with such repetition, the apparent differences in the tetrads of FIG. 3A are inconsequential to the overall sampling strategy and are better viewed as merely representing a minor sidewise shifting of the repeating pattern.

To develop a two-dimensional element arrangement for such image sampling arrays, the patterns of adjacent lines (rows or columns) are shifted, according to the invention, by one element. Such shifting necessarily causes the luminance elements, which alternate in the individual tetrads, to occur in the highly efficient checkerboard pattern described by Bayer (U.S. Patent Application No. 555,477 filed Mar. 5, 1975 mentioned above) and results in closely spaced patterns for all three colors in both fields of the array. FIG. 4 serves to indicate, from the standpoint of a single element, the possible shift sequences within the imposed one-element shift constraints.

As will appear below, during consideration of a preferred implementation for the invention, a continuing line-to-line shift in one direction results in any given line being repeated, from a color pattern standpoint, at four line intervals. This repetition occurs because the tetrad groupings themselves repeat, according to the invention, along each line and hence, a line shift of four elements in one direction corresponds to a shifting over one tetrad in a repeated sequence of similar tetrads.

It will be appreciated that such regular and close repetition in two directions (non-luminance colors repeat every four elements along both rows and columns) is desirable from both a sampling and signal processing convenience standpoint.

To describe particular two-dimensional arrangements of color responsive elements, a sequence representing shifts from a reference line perpendicular to the alignment direction of the tetrads may be used (see FIG. 5A). Under the shift constraints of the invention such sequence may include only ones and minus ones i.e., shifts of one element in a position or negative direction:

A procedure for developing a two-dimensional sampling arrangement according to the invention is indicated by FIGS. 5A through 5D. First a displacement sequence is defined which includes only ones and/or minus ones. This sequence defines the shift trajectory (see FIG. 5B) for the lines of repeated tetrads (columns or rows).

By shifting adjacent lines in accordance with the trajectory, a final pattern is developed (FIG. 5C). Such two dimensional sampling patterns, as a result of the special constraints imposed (repeated tetrads and unit shifting), necessarily have, as mentioned above, a dominance of luminance elements which elements are repeated at a regular sampling frequency in two orthogonal directions. Moreover, as can be seen from FIG. 5D, all three of the preselected basic colors occur in each field of an interlaced readout array in closely repeated patterns. To assure closely repeated and regular patterns it is preferable to use a shift sequence that repeats itself in four or less lines. This property is achieved if the sequence (FIG. 5A) repeats and sums to zero within (inclusively) four lines or repeats and sums to plus or minus four in four lines (as for the configuration of FIG.

5C). In this regard it should be noted that a line displacement of four in the positive or negative direction results in a repeated line because the tetrads repeat a line at a frequency of four elements.

The pattern of FIG. 5C is presently preferred for implementation because, for all three colors, a fixed respective sampling rate (FIG. 5D) obtains for all rows and columns (the same pattern with negative line-to-line displacements is essentially the same from a sampling standpoint).

An alternative pattern is indicated in the development of FIGS. 6A through 6D. This pattern while not having the sampling uniformity of the presently preferred pattern does have the advantage, from a signal processing standpoint, of having only two types of rows; one type in each field. With each field having a respective specific order in which color information is arranged, it will be appreciated that demultiplexing of the array output signals is somewhat simplified.

Referring now to FIG. 7A through 7D a sampling configuration is developed wherein the tetrads are aligned in columns (i.e., perpendicular to the direction of line scanning on the array) and are shifted columnwise, alternately, for plus and minus one position. With this set of constraints, the resultant configuration has the characteristic that one of the non-luminance colors is missing from each line. Hence, in order to produce three color signals during each and every row scan, information must be stored from one row to another. This situation points up an advantage to the row alignment for tetrads where luminance color repeats regularly at every other element of every row (scan line) and the other colors repeat regularly once in every four elements. Nonetheless, it will be appreciated that the application of constraints according to the invention does result, even for the columnwise alignment, in a configuration in which luminance is sampled at a relatively high spatial frequency in two directions and all three colors are sampled in closely repeated patterns in both fields of the array.

The invention has been described in detail with reference to specific preferred implementations thereof, however, it will be appreciated the modifications and variations within the spirit and scope of the invention will be suggested to those skilled in the art. For example, various types of rectangular imaging arrays might be employed including charge-injection-type arrays, and such arrays may be "front" or "backside" lighted. Also, various methods might be employed to selectively control the response of the individual array elements, for example, lenticular filters might be used to selectively modulate light according to color before reaching the array.

What is claimed is:

1. A color imaging device comprising a rectangular array of interrogable photoelectric elements, such elements being selectively responsive to respective colors which correspond to a preselected three color basis, one color of which corresponds essentially to luminance;
   said elements being arranged in a configuration wherein alignments along one major dimension of the array consist essentially of a repeated four element grouping having two luminance-responsive elements alternating with elements responsive respectively to the other two colors of said basis, each successive such alignment being shifted by one element position but otherwise having substantially the same color pattern.

2. A color imaging device according to claim 1 wherein the luminance color corresponds essentially to the green portion of the spectrum and the other color basis colors correspond essentially to the blue and red portions of the spectrum.

3. A color imaging device according to claim 1 wherein the color responsive elements are elements of chargecoupled imaging array having absorption-type filters superposed in one-to-one registration therewith.

4. A color imaging device comprising a rectangular array of photoelectric elements which are interrogable in an interlaced manner by rows progressing from a first row at one end of said array, such elements being selectively responsive to respective colors which form a preselected three color basis one color of which corresponds essentially to luminance;
   said elements being arranged in a configuration wherein alignments along one major dimension of the rectangular array consist essentially of a repeated four element grouping having two luminance-responsive elements alternating with elements responsive respectively to the other two colors of said basis, each successive such alignment being shifted one element in a preselected direction paralleling the grouping alignments.

5. A color imaging device according to claim 4 wherein the direction of grouping alignment is a direction corresponding to the row axis and said groupings are shifted by one element to the right for adjacent rows in progressing from said first row to the opposite side of the array.

6. A color imaging device comprising a rectangular array of elemental photoelectric areas, each said area being responsive to a respective color from a three color basis, and one such color corresponding essentially to luminance, said luminance responsive elements, for a given diagonal direction, occurring exclusively at every other diagonal of the array, the other two color responsive elements alternately occurring exclusively along the remaining diagonals of that same direction and, for the remaining diagonals in one diagonal direction, the elements alternating between responses for the two non-luminance colors of the basis from one diagonal to the next.

7. A light responsive array for color imaging comprising:
   rows of elements which are respectively sensitive to individual colors of a three color basis, one color of which corresponds to luminance, such rows being made up of repeated groupings of two luminance corresponding color elements alternating with individual elements for the other two basic colors, each successive such row being, essentially, of the same pattern as the preceding row but is shifted one element in a row direction.

8. An array according to claim 6 wherein the one element shift is uniformly in the same row direction.

* * * * *